W. M. HOGLE.
FUEL RESERVE ATTACHMENT FOR SUPPLY TANKS.
APPLICATION FILED OCT. 21, 1914.

1,135,018.

Patented Apr. 13, 1915.

Witnesses
Chas. W. Stauffiger
Anna M Dorr

Inventor
William M. Hogle
By Bartlett & Bartlett
Attorneys

UNITED STATES PATENT OFFICE.

WILLIAM M. HOGLE, OF DETROIT, MICHIGAN.

FUEL-RESERVE ATTACHMENT FOR SUPPLY-TANKS.

1,135,018. Specification of Letters Patent. Patented Apr. 13, 1915.

Application filed October 21, 1914. Serial No. 867,853.

*To all whom it may concern:*

Be it known that I, WILLIAM M. HOGLE, a citizen of the United States of America, residing at Detroit, in the county of Wayne and State of Michigan, have invented certain new and useful Improvements in Fuel-Reserve Attachments for Supply-Tanks, of which the following is a specification, reference being had therein to the accompanying drawings.

This invention relates to an automobile accessory, and more particularly to a gasolene supply outlet member adapted to maintain a reserve supply in the tank, which reserve may be used by opening a valve in said member after the main body of fuel is exhausted.

The primary object of my invention is to provide an outlet member for a gasolene tank which will maintain a reserve or emergency supply within the tank and which may be quickly and easily installed upon cars in connection with the usual equipment of supply tank and sediment trap without the necessity for changes in construction or addition of parts other than said member; and further, to provide a member adapted to form a connection between the tank and sediment trap which may be screwed into place in the manner of an ordinary fitting.

The above and other objects are attained by a mechanical construction that will be hereinafter specifically descibed and then claimed, reference being had to the accompanying drawing, wherein—

Figure 1:
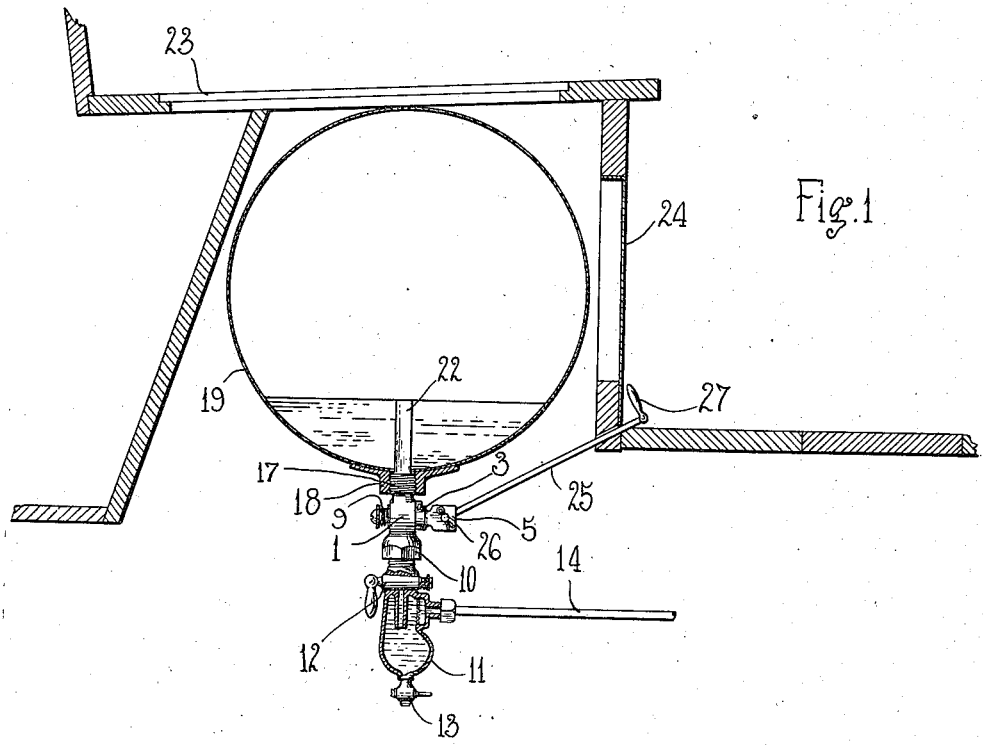
Figure 2:
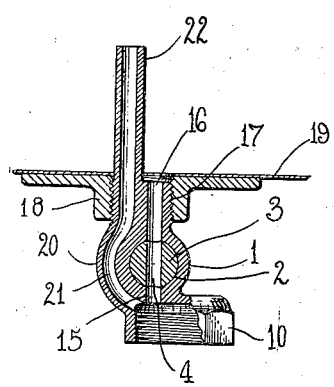
Figure 3:
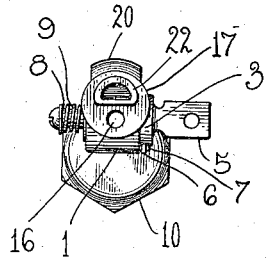
Figure 4:
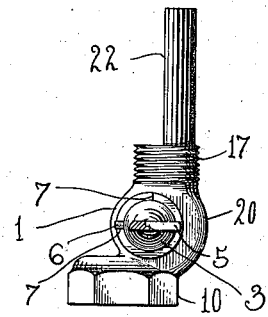

Figure 1 is a side elevation of an outlet member embodying the invention and showing the same in operative relation to the gasolene supply tank and sediment trap upon an automobile; Fig. 2 is a vertical sectional view of the outlet member detached; Fig. 3 is a plan of the same; and Fig. 4 is a front elevation of the member.

The outlet member or fitting comprises a body 1 provided with a tapering bore 2 for a rotatable plug 3, which has a transverse port 4. The large end of the plug 3 terminates in a flat head 5 and contiguous to said head is a stop pin 6 adapted to engage shoulders 7 of the body 1 and limit the movement of the plug 3 therein. The small end of the plug 3 terminates in a stem 8 encircled by a coiled compression spring 9 and this spring retains the plug normally seated in the bore 2, but permits of easy rotation of the same to open or close the port.

Formed integral with the body 1 is a screwthreaded socket 10 to receive the nipple of a sediment trap 11, said trap having a shut-off valve 12, a drain or pet cock 13, and an outlet pipe 14. The sediment trap and its appurtenant parts are of a conventional form and it has heretofore been directly connected to the gasolene tank 19 by screwing the same into the coupling 18 on the bottom thereof.

The body 1 is formed with a passage 15 opening into the socket 10 with which the port 4 in the plug 3 is adapted to register, thereby establishing communication between the socket 10 and a port or passage 16 in a nipple 17 on the upper end of the body 1. This nipple 17 is exteriorly screwthreaded and is offset relative to the body 1 to engage the coupling 18 which is secured to the bottom of the gasolene supply tank 19 around a discharge opening therein.

The body 1 has an enlargement 20 connecting the nipple 17 and the socket portion 10 formed with a by-pass 21 opening into the socket and extending through the nipple and through a stem 22 on the nipple which extends upwardly into the tank a considerable distance. This by-pass around the valve 3 forms the main gasolene outlet passage and opens through the upper end of the stem which is a considerable distance above the bottom of the tank and thus maintains a quantity of gasolene in the bottom of the tank when the valve 3 is closed. The stem 22 is vertically disposed and is semi-cylindrical as best shown in Figs. 3 and 4, thereby providing clearance in the end of the nipple for the port 16, which constitutes an auxiliary outlet for gasolene when the valve 3 is opened, and permits the drawing off of the auxiliary or reserve supply from the bottom of the tank.

In the automobile construction illustrated in Fig. 1 the gasolene tank 19 is located beneath a seat 23 having a heel board 24 adjacent the forward side of the tank, and to provide ready means for turning the valve 3, a rod 25 is extended through an opening in this board and made fast to the head 5 by bending the end 26 of the rod and engaging it with an opening in the head. The opposite end of the rod is provided with a crank handle 27 for turning the rod to open or close the valve.

In the normal operation of the device, the valve 3 is closed to prevent the flow of gasolene through the auxiliary passage, the main passage 21 being always open and permitting the fluid to pass therethrough into the sediment trap 11 and then through the outlet pipe 14 to the engine carbureter (not shown). The fuel will thus flow to the engine until the supply of gasolene within the tank 19 falls to a level below the upper end of the stem or conduit 22 when it will cease and the operator will be notified by the stopping of the motor due to lack of fuel, that the supply of gasolene in the tank is getting low. He may then open the valve 3 by simply turning the lever 27 and permit the reserve or emergency supply to be drawn upon, which supply will ordinarily be sufficient to run the engine until he reaches some place where he may secure a further supply.

I attach considerable importance to the fact that it is only necessay to unscrew the sediment trap 11 as now installed, screw into its place my improved fitting, and then screw the sediment trap into the socket of the accessory thus effecting the installation of the device without any material change in the present arrangement of these elements as now applied in automobile construction, and without the help of a skilled mechanic or tools other than an ordinary wrench.

From the foregoing it will be observed, that I have devised a novel fitting adapted to be interposed between a supply tank and a sediment trap which will serve to hold a portion of the contents of a supply tank in reserve and which may be readily operated to permit the use of this reserve in an emergency.

One embodiment of my invention has been illustrated, but it is to be understood that the structural elements are susceptible to such variations and modifications as fall within the scope of the appended claims.

What I claim is:

1. The combination with a gasolene supply tank and a sediment trap, of a fitting interposed between said tank and said trap, said fitting having a passage in communication with said tank, a valve normally closing said passage, and a conduit on said fitting extending around the valve into said tank and formed with an open outlet passage independent of said valve whereby the greater part of the contents of said tank may flow into said trap through said open passage.

2. A fitting comprising a body, an offset nipple carried thereby, said nipple having a port therein, a hollow stem carried by said nipple and having a flattened side whereby clearance is provided in the end of the nipple for the port alongside said stem, a connection carried by said body, said body having a by-pass therein establishing communication between said stem and said connection, and a ported plug rotatable in said body and normally closing said port in the nipple.

3. A fitting comprising a body, a nipple carried thereby, said nipple having a port therein, a hollow stem carried by said nipple, a connection carried by said body, a ported plug rotatable in said body and normally closing the port in said nipple, and a by-pass in said body establishing communication between said stem and said connection.

In testimony whereof I affix my signature in presence of two witnesses.

WILLIAM M. HOGLE.

Witnesses:
 LEWIS E. FLANDERS,
 ANNA M. DORR.